INVENTORS.
BARRETT L. CUPPLES
CLARENCE R. MURPHY
WILLIAM L. WALSH

United States Patent Office

3,686,076
Patented Aug. 22, 1972

3,686,076
SEPARATION OF DRY HBr FROM A DILUTE AQUEOUS SOLUTION OF HBr
Barrett L. Cupples, Plum Borough, Clarence R. Murphy, Allison Park, and William L. Walsh, Glenshaw, Pa., assignors to Gulf Research & Development Company, Pittsburgh, Pa.
Filed Dec. 18, 1969, Ser. No. 886,080
Int. Cl. B01d 3/00
U.S. Cl. 203—12                                    5 Claims

ABSTRACT OF THE DISCLOSURE

HBr is separated in substantially dry form from an aqueous solution containing less than 50 weight percent HBr by a double sequential distillation technique. The first distillation zone is operated at subatmospheric pressure while the second distillation zone is operated at superatmospheric pressure. The bottoms from the first distillation zone enriched in HBr serves as the charge to the second distillation zone. If a water soluble organic acid is also present, it can be initially removed with water in a distillation tower operated at a pressure of atmospheric or above.

---

Figure 1:
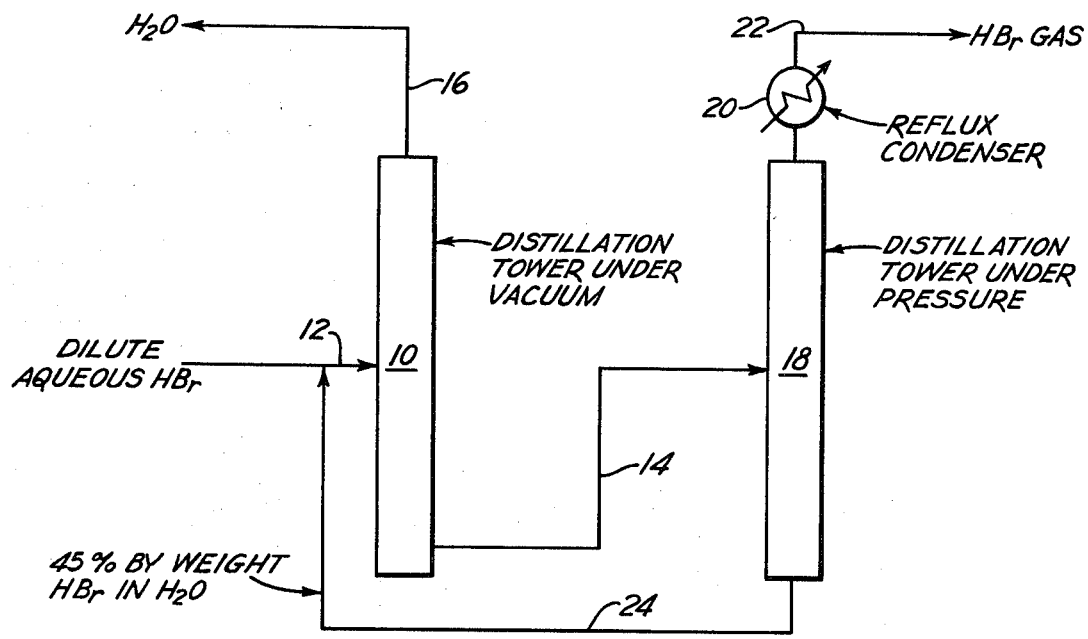

This invention relates to a method of separating substantially dry HBr gas from aqueous solutions of HBr containing less than 50 weight percent HBr without the need of refrigerants.

In the esterification of alkyl bromides with organic acids, esters are produced along with gaseous, HBr. The use of aqueous organic acids in the esterification reaction results in improved yields but also gives rise to difficult separation problems in the recovery of the HBr from admixture with the water and organic acids since the HBr dissolves almost completely in the aqueous product phase. When propionic acid is used as the organic acid, further complications ensue as not only does the HBr form an azeotrope with water, but additionally, so does the propionic acid.

Despite the formation of the azeotropes, a scheme has been developed for the separation of substantially dry HBr gas from an aqueous solution of HBr containing less than 50 weight percent HBr by a series of carefully controlled distillation steps. By following the technique of this invention, no refrigeration or other expensive procedures are required.

In accordance with the invention, substantially dry HBr gas is separated from a first solution comprising water and less than 50 weight percent HBr by a process which comprises: distilling said first solution in a first distillation zone under a vacuum of less than 760 mm. of mercury to remove water as an overhead product and a second aqueous solution as a first bottoms product more concentrated with respect to HBr than the original solution; and then distilling said second solution in a second distillation zone at a superatmospherc pressure of greater than 20 p.s.i.g. to remove substantially dry HBr gas overhead and a third aqueous solution as a second bottoms product less concentrated with respect to HBr than the said first bottoms product.

In one preferred embodiment of this invention, the HBr is separated from a solution comprising from 1 to 50, preferably 3 to 44, weight percent HBr, from 49 to 98 weight percent water and from 1 to 20 weight percent of a water soluble organic acid having from one to five carbon atoms per molecule by a three zone distillation technique wherein the first zone the organic acid is removed overhead under a distillation pressure of at least 760 m. Hg (atmospheric) and wherein said second distillation zone water is removed as an overhead product at a distillation zone pressure of less than 760 mm. Hg (atmospheric) and wherein said third distillation zone substantially dry HBr gas is removed as an overhead product at a pressure of at least 20 p.s.i.g. and wherein the bottoms products from the first and second distillation zones serve as the charge stocks to the second and third distillation zones respectively.

The separation scheme of this invention is applicable to the separation and recovery of substantially dry HBr gas from any mixture comprising water and less than 50 weight percent HBr. The mixture may comprise from 55 to 99 weight percent water and from one to 45 weight percent HBr. Such aqueous solutions of HBr are obtained, for example, as a by-product from the esterification of alkyl bromides with aqueous organic acids such as propionic acid. Usually these by-product aqueous solutions of HBr from esterification reactions contain from 70 to 87 weight percent water and from three to ten weight percent HBr. The aqueous HBr mixture may contain from one to 20, usually from 10 to 20, weight percent of a water soluble organic acid such as propionic acid.

It has been found that substantially dry HBr gas can be recovered from the above-described aqueous solutions of HBr by distillation of the solution in a first distillation zone at subatmospheric pressures followed by distillation of the bottoms product from the first distillation zone at superatmospheric pressures to recover substantially dry HBr gas as an overhead product from the second distillation zone. The operating pressure of the first distillation zone is suitably less than 760 mm. of Hg, is preferably from 50 to 400 mm. of Hg, and is more preferably about 100 mm. of Hg. The operating pressure of the second distillation zone is suitably from 20 to 100 p.s.i.g. and is preferably about 60 p.s.i.g. The column temperatures in the first distillation zone are usually from 100 to 220° F. and are preferably from 126 to 168° F. The column temperatures in the second distillation zone are usually from about 300 to 410° F. and are preferably from about 350 to about 360° F.

The process of the subject invention will be described in greater detail with reference to the attached FIG. 1. The dilute aqueous HBr solution containing about five weight percent HBr enters distillation column 10 through line 12 either near the center or into the top portion. The distillation column 10 is operated at subatmospheric pressure of about 100 mm. of mercury and a column temperature of about 126° F. The column 10 has from about 12 to 20 theoretical plates. Under these conditions water is removed as an overhead product through line 16 and an aqueous solution of HBr containing about 50 weight percent HBr is removed as a bottoms product through line 14.

The bottoms product from distillation column 10 which is removed via line 14 is sent to a second distillation column 18 which is operated at a superatmospheric pressure of about 60 pounds per square inch gauge and a column temperature of about 355° F. The column 18 usually has from about three to about six theoretical plates. A reflux condenser 20 cooled with ambient temperature water is placed atop distillation tower 18 to condense those products which will condense under these conditions and return them to distillation column 18. HBr gas in substantially dry form is removed from the top of distillation column 18 via line 22. The bottoms product from distillation column 18 which is removed vie line 24 is an aqueous solution of HBr containing about 45 weight percent HBr. This aqueous solution can be recycled to column 10 via line 12.

EXAMPLE 1

An aqueous solution of HBr containing 56 weight percent and 44 weight percent HBr by weight was passed into a first distillation column operated at a pressure of 100 mm. of mercury absolute and a column temperature of 126° F. (a pot temperature of 168° F.). An overhead product was removed and was found to consist essentially of water. A bottoms product was removed and was found to contain about 50 weight percent water and 50 weight percent HBr. The bottoms product from the first distillation zone was charged to a second distillation column operated at a pressure of 75 pounds per square inch gauge and a column temperature of 360° F. The reflux ratio in the first distillation zone was 10:1 from a column containing about 12 theoretical plates. The reflux ratio in the second distillation column was total except for HBr (gas) from a column containing approximately seven theoretical plates. The product removed overhead from the second distillation at column was substantially dry HBr gas while the bottoms product was an aqueous solution of HBr containing about 45 weight percent HBr. This bottoms product is suitable for use as a recycle stream to the first distillation zone.

Further complications are added to the separation of substantially dry HBr gas from a dilute aqueous solution by the presence of soluble organic acids having from 1 to 5 carbon atoms per molecule. Such soluble organic acids include formic acid; acetic acid; propionic acid; butyric acid and valeric acid. Some of these organic acids form an azeotrope with water. Fortuitously, however, the separation of substantially dry HBr gas from admixture with water and a soluble organic acid such as propionic acid can be achieved by a three zone distillation technique wherein the first zone is operated at atmospheric pressure or above, preferably at a pressure of 20 to 75 p.s.i.a., and most preferably at a pressure of 45 p.s.i.a., and a column temperature from 275° to 320° F.; the second zone is operated at subatmospheric pressure and the third zone is operated at superatmospheric pressure. The pressure and temperature ranges for the second and third zones in the three zone technique correspond to the ranges given for distillation zones one and two above in the two zone technique. This separation scheme will be better described with reference to FIG. 2 attached.

Figure 2:
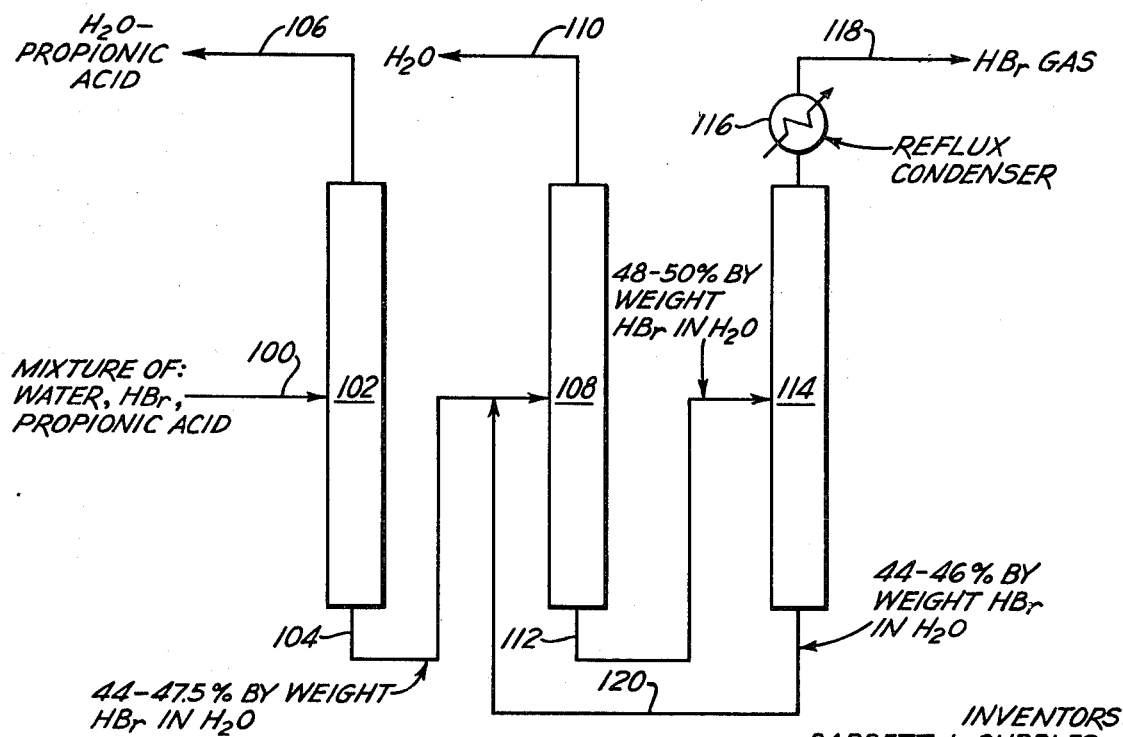

Referring to FIG. 2, the mixture of water, HBr and water-soluble organic acid enters through line 100 into a first distillation column 102 which is operated at a pressure from atmospheric to 75 p.s.i.g.; a pot temperature of about 260° to 360° F.; and a reflux temperature of 212 to 320° F. Column 102 can suitably have from 15 to 25 theoretical plates. The organic acid is removed overhead, as an azeotrope with water if an azeotrope forms, through line 106 and is substantially free of dissolved HBr. The bottoms product of tower 102 is removed through line 104 and is an aqueous solution of HBr containing from 44 to 47.5 weight percent HBr. The bottoms product is passed through line 104 into a second distillation tower 108 which is operated at a pressure of less than 760 mm. Hg and usually a pressure between 50 and 400 mm. Hg. The temperature conditions and the number of theoretical plates in tower 108 is similar to tower 10 of FIG. 1. Water is removed from distillation tower 108 via line 110 as an overhead product. The bottoms product of distillation tower 108 is removed through line 112 and is essentially an aqueous solution of HBr containing from 48 to 50 weight percent HBr. The bottoms product of distillation tower 108 is fed into a third distillation tower 114 which is operated at a superatmospheric pressure of from 20 to 1700 p.s.i.g. Tower 114 is similar to tower 18 of FIG. 1. The overhead product from distillation tower 114 passes through a water-cooled condenser 116 which is operated to condense any liquid products at those ambient conditions which are then returned to distillation tower 114. Dry HBr gas is removed from the top of distillation tower 114 through line 118 and an aqueous solution of HBr containing from 44 to 46 weight percent HBr is removed as a bottoms product from distillation tower 114 and is recycled to tower 108 via line 120.

EXAMPLE 2

An aqueous solution of HBr containing 80.5 weight percent water, 3.5 weight percent HBr and 16 weight percent propionic acid was passed into the sixth plate of a 12 theoretical plate first distillation column operated at atmospheric pressure at column temperatures of 215° to 262° F. and at a reflux ratio of 0.75:1.

An overhead product was removed and found to contain 83 weight percent water and 17 weight percent propionic acid. Substantially no HBr was dissolved in the water-propionic acid azeotrope.

The bottoms product was found to contain 52.8 weight percent water and 47.2 weight percent HBr. This was passed into the seventh plate of a 14 theoretical plate second distillation column operated at 100 mm. Hg and at column temperatures of 126°–170° F. and a reflux ratio of 0.5:1.

Water was removed as the overhead product of the second distillation column while an HBr aqueous solution containing 49.8 weight percent HBr was removed as the bottoms product. This bottoms product was passed onto the top plate of the third column containing five to six theoretical plates operated at 75 p.s.i.a. and a column temperature of 355° F. and with a total reflux of condensables.

Substantially dry HBr gas was removed as the overhead product after passing through a water cooled condenser. The bottoms product is an aqueous HBr solution containing 45 weight percent HBr and can be recycled to the second distillation zone.

Resort may be had to such variations and modifications as fall within the spirit of the invention and the scope of the appended claims.

We claim:

1. A process for the separation of HBr from its solution with water and an organic acid having from 1 to 5 carbon atoms per molecule which comprises:
   distilling said solution in a first distillation zone under a pressure of at least atmospheric to remove the organic acid overhead and a second aqueous solution substantially free of said organic acid and containing less than about 50 weight percent HBr as a bottoms product; and then
   distilling said second solution in a second distillation zone under a vacuum of less than 760 mm. Hg to remove a product overhead consisting essentially of water and a third aqueous solution as a bottoms product containing about 50 weight percent HBr and then
   distilling said third solution in a third distillation zone at a superatmospheric pressure of greater than 20 p.s.i.g. to remove an overhead product; passing said overhead product through a reflux condenser cooled with ambient temperature water to condense those products which will condense under these conditions and return them to said second distillation zone; and recovering substantially dry HBr gas as the overhead product from said reflux condenser and a fourth aqueous solution as a bottoms product containing about 45 weight percent HBr.

2. A process according to claim 1 wherein said fourth aqueous solution is recycled to be combined with said second aqueous solution.

3. A process according to claim 2 wherein the pressure in said first distillation zone is from 0 to 75 p.s.i.g., the pressure in said second distillation zone is from 50 mm. Hg to 400 mm. Hg and the pressure in said third distillation zone is from 20 to 100 p.s.i.g.

4. A process according to claim 2 wherein the first solution consists essentially of from 70 to 87 weight percent water, from 10 to 20 weight percent of said organic acid and from 3 to 10 weight percent dissolved HBr.

5. A process according to claim 4 wherein said organic acid is propionic acid.

References Cited

UNITED STATES PATENTS

| | | | |
|---|---|---|---|
| 1,892,652 | 12/1932 | Heath | 203—12 XR |
| 2,350,256 | 5/1944 | Shiras et al. | 203—12 |
| 2,901,407 | 8/1959 | Colton | 203—78 |
| 1,853,330 | 4/1932 | Barstow et al. | 203—12 |
| 2,678,298 | 5/1954 | Nicolaisen | 203—12 |
| 3,394,056 | 7/1968 | Nadler et al. | 203—12 |
| 2,665,240 | 1/1954 | Brumbaugh | 203—12 |

NORMAN YUDKOFF, Primary Examiner

D. EDWARDS, Assistant Examiner

U.S. Cl. X.R.

203—80, 91; 23—154

PO-1050
(5/69)

UNITED STATES PATENT OFFICE
CERTIFICATE OF CORRECTION

Patent No. 3,686,076                    Dated   August 22, 1972

Inventor(s)  Barrett L. Cupples, Clarence R. Murphy and William L. Walsh

It is certified that error appears in the above-identified patent and that said Letters Patent are hereby corrected as shown below:

Col. 1, line 71 - "760 m." should be --760 mm.--;

Col. 2, lines 71 and 72 - "56 weight percent and" should read --56 weight percent water and--;

Col. 3, line 16 - delete "at";

Col. 3, line 66 - "20 to 1700 p.s.i.g." should read --20 to 100 p.s.i.g.--.

Signed and sealed this 6th day of February 1973.

(SEAL)
Attest:

EDWARD M. FLETCHER, JR.                         ROBERT GOTTSCHALK
Attesting Officer                               Commissioner of Patents